Figure 1:
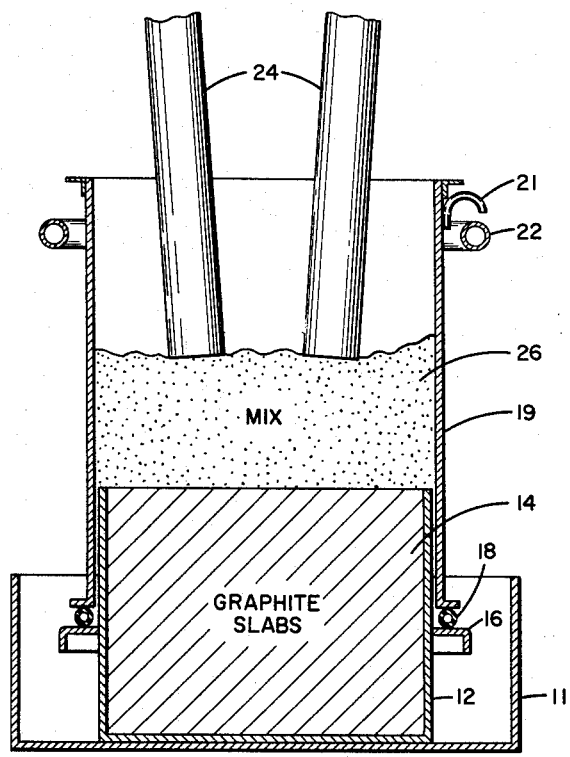

Dec. 18, 1962  J. C. McMULLEN ETAL  3,069,238
METHOD FOR MAKING ZIRCONIUM BORIDE
Filed March 21, 1960

INVENTORS.
JOHN C. McMULLEN and
WILLIAM D. McKEE, JR.
BY

ATTORNEY

United States Patent Office 3,069,238
Patented Dec. 18, 1962

3,069,238
METHOD FOR MAKING ZIRCONIUM BORIDE
John C. McMullen, Niagara Falls, and William D. McKee, Jr., Lewiston, N.Y., assignors to The Carborundum Company, Niagara Falls, N.Y., a corporation of Delaware
Filed Mar. 21, 1960, Ser. No. 16,365
5 Claims. (Cl. 23—204)

This invention relates to the production of zirconium boride, more particularly, to a new process for the manufacture of zirconium boride and a raw batch therefor.

The properties of zirconium boride suggest many important industrial applications if it can be produced economically. Its dense structure and extreme hardness give it exceptional abrasion resistance. It has excellent refractory properties, its melting point being approximately 5500° F. It resists corrosion by molten metals and salts and has a high electrical conductivity. Its chemical nature makes it useful as a metallurgical additive.

While these highly useful properties of zirconium boride have been known, its use has been limited due to the extreme cost of the compound. For example, the aluminum industry is interested in the use of zirconium diboride in collector bars used in the electrolytic manufacture of aluminum. However, the cost of preparing zirconium boride of the requisite purity has prohibited its use in this field.

All presently known processes for the manufacture of zirconium boride utilize zirconia ($ZrO_2$) as one of the starting materials. The well-known McKenna process consists of reacting zirconia, boric oxide, and carbon. A more recent method comprises reacting zirconia, boron carbide, and carbon to form zirconium boride. A third method utilizes zirconium metal, zirconia, and boron carbide. Each of these processes is essentially a two-step operation. Zirconia is not found in nature in sufficient quantity or of sufficient purity for use in the manufacture of zirconium boride and, therefore, is generally manufactured from zircon ($ZrSiO_4$).

Our new process enables the production of zirconium boride in a one-step process using zircon as the source of zirconium. Essentially, it consists of reacting zircon, boric oxide, and carbon at arc furnace temperatures. Zircon having a purity of 97/98 percent is available for approximately five cents per pound, whereas zirconia having a purity of 98/99 percent costs approximately eighty cents per pound. Thus, the enormous savings which our process makes available are apparent. It has been estimated that zirconium boride can be produced by our process for approximately one third of the cost of zirconium boride made by the old processes.

Figure 2:
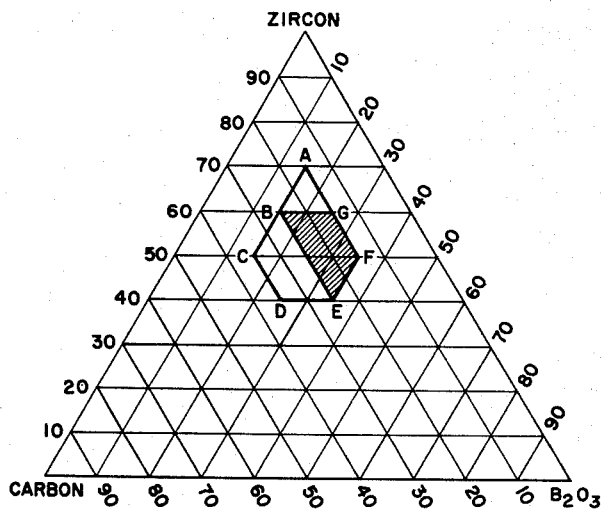

In the drawings:

FIGURE 1 is a vertical section taken through an arc furnace which may be used in carrying out our process; and FIGURE 2 is a triaxial diagram graphically illustrating the preferred compositions for the raw batch of our invention.

In making zirconium boride according to our invention, a raw batch composed of zircon, a source of boric oxide, and carbon is reacted at high temperature. The requisite temperatures are best obtained in an arc furnace such as that illustrated in FIGURE 1, wherein a box structure 12 filled with graphite slabs 14 is mounted in base 11 on which the furnace is supported. The slabs 14 protect the bottom of the furnace from the high temperatures existing in the reaction area of the furnace. Raw batch may be used for this purpose rather than the graphite slabs.

A furnace shell 19 extends from and surrounds the upper portion of the box structure and is supported on angle irons 16 welded to the box structure. A relatively heavy gasket member 18 is interposed between the shell 19 and irons 16. Lifting lugs 21 are spaced about the upper edge of shell 19 to allow easy disassembly of the furnace when necessary. A water spray ring 22, which is disposed about the furnace shell, enables rapid water cooling of the outer surface of the shell when desired.

Graphite electrodes 24 extend downwardly into the interior of the furnace shell contacting raw batch 26 prepared in accordance with our invention. The initial electrical contact between the electrodes is made through a train of granular graphite placed in a ditch hollowed out of the surface of the bed of mix. Once the load has been established, mix is fed in regularly and the electrodes are raised as the ingot grows. At the end of the run, the electrodes are pulled out and the furnace covered with coke to prevent oxidation of the ingot.

When the contents of the furnace are below red heat, the ingot may be removed without the danger of oxidation. The furnace shell is lifted by placing hooks under lugs 21. The unreacted mix, commonly referred to as "old mix," generally separates cleanly from the mix. Thus, the ingot can be easily removed and crushed into the desired size particles necessary for use in fabricating shapes.

In FIGURE 2, we have shown a preferred range of compositions for a raw batch made according to our invention bounded by points ABCDEFG. Wherever percentages are given, it is intended to mean percentages by weight. Thus, we prefer a raw batch composed as follows:

| | Percent |
|---|---|
| Zircon ($ZrSiO_4$) | 40–70 |
| Boric oxide ($B_2O_3$) | 15–35 |
| Carbon | 15–35 |

A product of still superior purity may be obtained by utilizing a raw batch having compositions shown in the shaded area bounded by points BEFG. Therefore, for best results, we prefer to use raw batches composed as follows:

| | Percent |
|---|---|
| Zircon ($ZrSiO_4$) | 40–60 |
| Boric oxide ($B_2O_3$) | 15–35 |
| Carbon | 15–25 |

Hafnium invariably occurs with zirconium. Ordinary commercial zircon contains about 0.5 to 2.0 percent hafnium. Inasmuch as it is extremely difficult to separate hafnium and zirconium and the properties of the two metals are very similar, the hafnium content is generally ignored for all purposes other than the use of zirconium in atomic reactors. The hafnium content of zircon used in our invention will be converted to hafnium boride.

The carbon required for our raw batch may be added in the form of coal, coke, graphite or other carbonaceous compounds. However, it is desirable to avoid coals with high ash content. While high purity boric oxide is preferable, the requisite boric oxide may be added in the form of boric oxide containing minerals such as borax, colemanite, ulexite and kernite.

The following examples will serve to illustrate the manufacture of zirconium boride according to our new process.

*Example I*

A raw batch was prepared of zircon, relatively pure boric oxide, and graphite using stiochiometric proportions required by the equation:

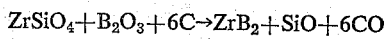

$$ZrSiO_4 + B_2O_3 + 6C \rightarrow ZrB_2 + SiO + 6CO$$

Thus, the raw batch has the following composition in percentages by weight: zircon, 56.3%; graphite, 22.2%;

and boric oxide, 21.5%. A small amount of kerosene was added to control dusting and aid in maintaining reducing conditions during furnacing.

This raw batch was placed in a furnace such as that shown in FIGURE 1 and the load established as described above. Additional raw batch was added regularly during the furnacing which lasted approximately seven hours and consumed 3103 kilowatt-hours of electricity. An ingot weighing 682 pounds was removed after the furnace had been cooled. An analysis thereof showed a zirconium boride content of over 92 percent.

*Example II*

A raw batch was prepared having the following composition in percent by weight:

| | Percent |
|---|---|
| Zircon | 21.9 |
| Graphite | 8.9 |
| Boric oxide | 19.2 |
| Old mix | 50.0 |

In each furnace run, there is always some unreacted mix. For economical operation, this old mix must be recovered and reused in following furnace charges.

The above mix was furnaced as discussed above for a period of thirteen hours. The operation consumed 5140 kilowatt-hours of electricity producing an ingot weighing 1102 pounds. An analysis of the ingot indicated a zirconium boride content of over 87 percent.

By the process described above and illustrated in the foregoing specific examples, we have obtained zirconium boride in a one-step operation using relatively inexpensive raw materials having a purity comparable to the present product obtained by the two-step methods described above. In general, using raw batches having compositions in the area BEFG of FIGURE 2, we can obtain better than 90 percent pure boride.

While we have described our invention in terms of the presently preferred raw batch and process, it is to be understood that it may be otherwise practiced within the scope of the following claims.

We claim:
1. A process for the manufacture of zirconium boride comprising reacting at high temperatures a mix comprising zircon, carbon, and a source of and containing boric oxide.

2. A process for manufacturing zirconium boride comprising reacting at arc furnace temperatures a mix comprising zircon, 40–70% by weight, carbon, 15–35% by weight, and a source of and containing boric oxide sufficient to provide 15–35% boric oxide.

3. A method of making zirconium boride which comprises preparing a raw batch comprising zircon, carbon and a source of and containing boric oxide in approximately the stoichiometric proportions required by the equation:

$$ZrSiO_4 + B_2O_3 + 6C \rightarrow ZrB_2 + SiO + 6CO$$

and reacting said mixture at arc furnace temperatures to form zirconium boride.

4. A method of making zirconium boride which comprises preparing a raw batch comprising zircon, 40–60% by weight, carbon, 15–25% by weight, and a source of and containing boric oxide sufficient to provide boric oxide in excess of that required for stoichiometric proportions by the equation:

$$ZrSiO_4 + B_2O_3 + 6C \rightarrow ZrB_2 + SiO + 6CO$$

and reacting said mixture at arc furnace temperatures to form zirconium boride.

5. A process for the manufacture of zirconium boride comprising reacting at arc furnace temperatures a mix comprising zircon, 40–60% by weight, carbon, 15–25% by weight, and a source of and containing boric oxide sufficient to provide 15–35% boric oxide.

References Cited in the file of this patent

"A course in General Chemistry," by McPherson and Henderson, third ed., pages 405, 414 and 415, Ginn and Co., N.Y.

"Encyclopedia of Chemical Reactions," by C. A. Jacobson, vol. 8, 1959 ed., page 273, Reinhold Pub. Corp., N.Y.